US012770425B2

(12) United States Patent
Liong et al.

(10) Patent No.: US 12,770,425 B2
(45) Date of Patent: Oct. 20, 2026

(54) DETECTION AND IDENTIFICATION SYSTEM

(71) Applicant: FENG CHIA UNIVERSITY, Taichung City (TW)

(72) Inventors: Sze Teng Liong, Taichung City (TW); Yee Siang Gan, Taichung City (TW); Yi Li Ho, Taichung City (TW); Shin Shuan Tai, Taichung City (TW); Wen Hung Lin, Taichung City (TW)

(73) Assignee: FENG CHIA UNIVERSITY, Taichung City (TW)

( * ) Notice: Subject to any disclaimer, the term of this patent is extended or adjusted under 35 U.S.C. 154(b) by 0 days.

(21) Appl. No.: 19/038,025

(22) Filed: Jan. 27, 2025

(65) Prior Publication Data

US 2025/0265863 A1 Aug. 21, 2025

(30) Foreign Application Priority Data

Feb. 16, 2024 (TW) ................................ 113105520

(51) Int. Cl.
*G06V 40/10* (2022.01)
*G06V 10/12* (2022.01)
(Continued)

(52) U.S. Cl.
CPC ............ *G06V 40/103* (2022.01); *G06V 10/12* (2022.01); *G06V 10/26* (2022.01); *G06V 40/161* (2022.01);
(Continued)

(58) Field of Classification Search
CPC .... G06V 40/103; G06V 10/12; G06V 40/172; G06V 40/161; G06V 10/26; H04N 23/695
See application file for complete search history.

(56) References Cited

U.S. PATENT DOCUMENTS

2014/0185763 A1* 7/2014 Chen ....................... G01T 1/167 378/62
2015/0131856 A1* 5/2015 Matsunaga ............ G06V 20/52 382/103

(Continued)

FOREIGN PATENT DOCUMENTS

CN 113240695 A 8/2021
TW 1808490 B 7/2023

*Primary Examiner* — Sunghyoun Park
(74) *Attorney, Agent, or Firm* — Daniel Polk; Darryl Scott

(57) ABSTRACT

A detection and identification system includes a display portion, an image-taking portion, and a protective clothing detection portion. The image-taking portion captures a full-body image of a person wearing protective clothing. The display portion displays the full-body image in real time. The protective clothing detection portion divides the full-body image into plural to-be-identified regions according to the joints of the human body, uses an anomaly detection method or semantic segmentation algorithm to determine whether each to-be-identified region meets detection criteria, and marks the to-be-identified regions in such a way that each to-be-identified region meeting, or failing to meet, the detection criteria is displayed by the display portion as marked with a first mark or a second mark respectively. The first and second marks are different-colored blocks or frames. The system allows the current condition of the protective clothing to be rapidly known so that appropriate handling measures can be taken.

10 Claims, 4 Drawing Sheets

(51) Int. Cl.
*G06V 10/26* (2022.01)
*G06V 40/16* (2022.01)
*H04N 23/695* (2023.01)

(52) U.S. Cl.
CPC ......... *G06V 40/172* (2022.01); *H04N 23/695* (2023.01)

(56) References Cited

U.S. PATENT DOCUMENTS

| | | | | |
|---|---|---|---|---|
| 2019/0164110 | A1* | 5/2019 | Shiraishi | G06N 20/00 |
| 2020/0410444 | A1* | 12/2020 | Bohannon | G06Q 10/0875 |

* cited by examiner

DETECTION AND IDENTIFICATION SYSTEM

BACKGROUND OF THE INVENTION

1. Technical Field

The present invention relates to an image processing technique and more particularly to a detection and identification system.

2. Description of Related Art

As more and more high-precision products emerge in the electronics industry, increasingly strict requirements are imposed on their production environments. In Taiwan, where the integrated circuit (IC) industry is highly developed, cleanrooms have become an indispensable part of IC manufacturing processes. Cleanroom suits not only have a superior antistatic function that can effectively reduce the damage caused to certain electronic devices by static electricity, but also help ensure high product quality.

Currently, however, inspection of the wearing of cleanroom suits still relies on the naked eye. The market has yet to be supplied with a total solution for automatic detection of worker equipment.

BRIEF SUMMARY OF THE INVENTION

The primary objective of the present invention is to provide a detection and identification system that combines such functions as image capturing, automatic detection and analysis, and real-time displaying and marking, so that the current condition of the protective clothing worn by a person under detection can be rapidly known to facilitate the adoption of appropriate handling measures.

To achieve the above objective, the detection and identification system provided by the present invention essentially includes a display portion, an image-taking portion, and a protective clothing detection portion. The image-taking portion is configured to perform a first image-taking operation, and when performing the first image-taking operation, the image-taking portion captures a full-body image of a person under detection, in order for the display portion to display the full-body image in real time. The protective clothing detection portion is configured to divide the full-body image into a plurality of to-be-identified regions according to the joints of the human body, use an anomaly detection method or a semantic segmentation algorithm to determine whether or not each to-be-identified region meets detection criteria, and mark the to-be-identified regions in such a way that each to-be-identified region that meets the detection criteria is displayed by the display portion as marked with a first mark while each to-be-identified region that does not meet the detection criteria is displayed by the display portion as marked with a second mark, wherein the first mark and the second mark are color blocks or color frames that are different in color. Thus, the system can clearly identify and mark any to-be-identified region that requires further attention or treatment as well as those having passed the detection, and in doing so, the system achieves high automation and instantaneity.

In one embodiment, the detection criteria are based on protective clothing wearing guidelines or the surface conditions of protective clothing.

In one embodiment, the to-be-identified regions are a head region, a torso region, a left arm region, a right arm region, a left leg region, and a right leg region.

In one embodiment, the image-taking portion is also configured to perform a second image-taking operation, and when performing the second image-taking operation, the image-taking portion captures a facial image of the person under detection. In addition, the detection and identification system further includes a database and an identity identification portion. The database stores plural pieces of worker data, wherein each piece of worker data includes historical identity information and historical facial information. The identity identification portion is configured to perform an identification process on the facial image, find the historical facial information in the database that matches the facial image, and thereby obtain the piece of worker data that matches the person under detection.

In one embodiment, each piece of worker data further includes historical body shape information and historical protective clothing information, wherein the historical protective clothing information includes a historical wearing size. In addition, the detection and identification system further includes a body shape detection portion for detecting the body shape of the person under detection in the full-body image with a semantic segmentation algorithm, computing to obtain real-time body shape information and real-time protective clothing information derived from the real-time body shape information, and transmitting the real-time body shape information and the real-time protective clothing information to the database to update the historical body shape information and the historical protective clothing information in the piece of worker data that corresponds to the person under detection.

In one embodiment, the system further includes a frame and an actuation portion. The image-taking portion is provided on the frame in a movable manner. The actuation portion is provided between the frame and the image-taking portion and is configured to drive the image-taking portion to move to a first image-taking position or a second image-taking position with respect to the frame. When the image-taking portion is at the first image-taking position, the image-taking area of the image-taking portion covers the full body of the person under detection so that the first image-taking operation can be carried out. When the image-taking portion is at the second image-taking position, the image-taking area of the image-taking portion covers the face of the person under detection so that the second image-taking operation can be carried out.

In one embodiment, the frame includes two parallel vertical posts that extend in the direction of gravity; the actuation portion includes: two slide rails each provided on one of the vertical posts and extending in the direction of gravity, two slide bases each provided on one of the slide rails in a movable manner, and two driving units each connected to one of the slide bases in order to drive the one of the slide bases into movement with respect to the corresponding slide rail; and the image-taking portion includes two image-taking units each provided on one of the slide bases.

In one embodiment, the system further includes a management portion for issuing warning information based on either the second mark or the real-time protective clothing information.

In one embodiment, the image-taking portion is configured to further perform a third image-taking operation, and when performing the third image-taking operation, the image-taking portion captures a moving image of the person under detection. In addition, the detection and identification system further includes a limb movement identification portion for identifying, with a semantic segmentation algorithm, whether or not the limb movement of the person under detection in the moving image meets a cleaning standard, the objective being to make sure that the person under detection completes a certain action before entering a cleanroom.

According to the above, the present invention has at least the following features and applications:

1. Enhancing workplace safety: The system can ensure that workers wear complete protective clothing, and this reduces the risks in a cleanroom and protects workers' health and safety.
2. Improving product quality: The system can reduce the risk of contamination in a cleanroom, ensuring that the products produced meet a strict cleanliness standard, thereby reducing product loss.
3. Automated protective clothing detection: The system eliminates the dependence on visual inspection and reduces the effects of subjective factors and negligence on equipment detection. In addition, the system uses a facial recognition technique and can predict the size of the required protective equipment based on a worker's body shape, provide personalized size recommendations, and estimate and record body shape changes in real time using a semantic segmentation algorithm in order to ensure fit.
4. Detection of protective equipment damage: Using an anomaly detection method or a semantic segmentation algorithm, the system can detect whether or not the equipment under detection is damaged or defective.
5. Automated detection of a worker's cleaning actions in an air shower room: When it comes to the cleaning actions required to be performed by a worker in an air shower room, the system can carry out detection in a small air shower room, in particular an air shower room having a 100 cm×80 cm rectangular floor space.
6. Self-adaptive cameras: To overcome the spatial limitations of an air shower room, the system can adjust the height or position of the image-taking portion automatically in order to capture proper images. In particular, the position of the image-taking portion can be adjusted according to a worker's stature.
7. Integration of edge computing and artificial intelligence of things (Edge-AIoT): The system can connect to the existing system or equipment in an air shower room by an edge computing technique, thus reducing the load of data transfer and cloud computing. Moreover, the data obtained can be uploaded to and recorded in a cloud to achieve better data integration and process coordination.
8. Support for an intelligent decision monitoring system: The system uses a self-adaptive algorithm to identify and deal with a worker's lack of compliance with protective equipment-related regulations.
9. Increasing energy efficiency: Taking energy efficiency factors into consideration, the system adopts an embedded system configuration, reduces power consumption through hardware and software optimization, and monitors the environment and the state of the apparatus in real time. For example, the system can adjust the lighting, heating, and cooling systems automatically to reduce unnecessary use of energy, and this helps increase energy efficiency and reduce carbon emissions.

DETAILED DESCRIPTION OF THE INVENTION

Figure 1:
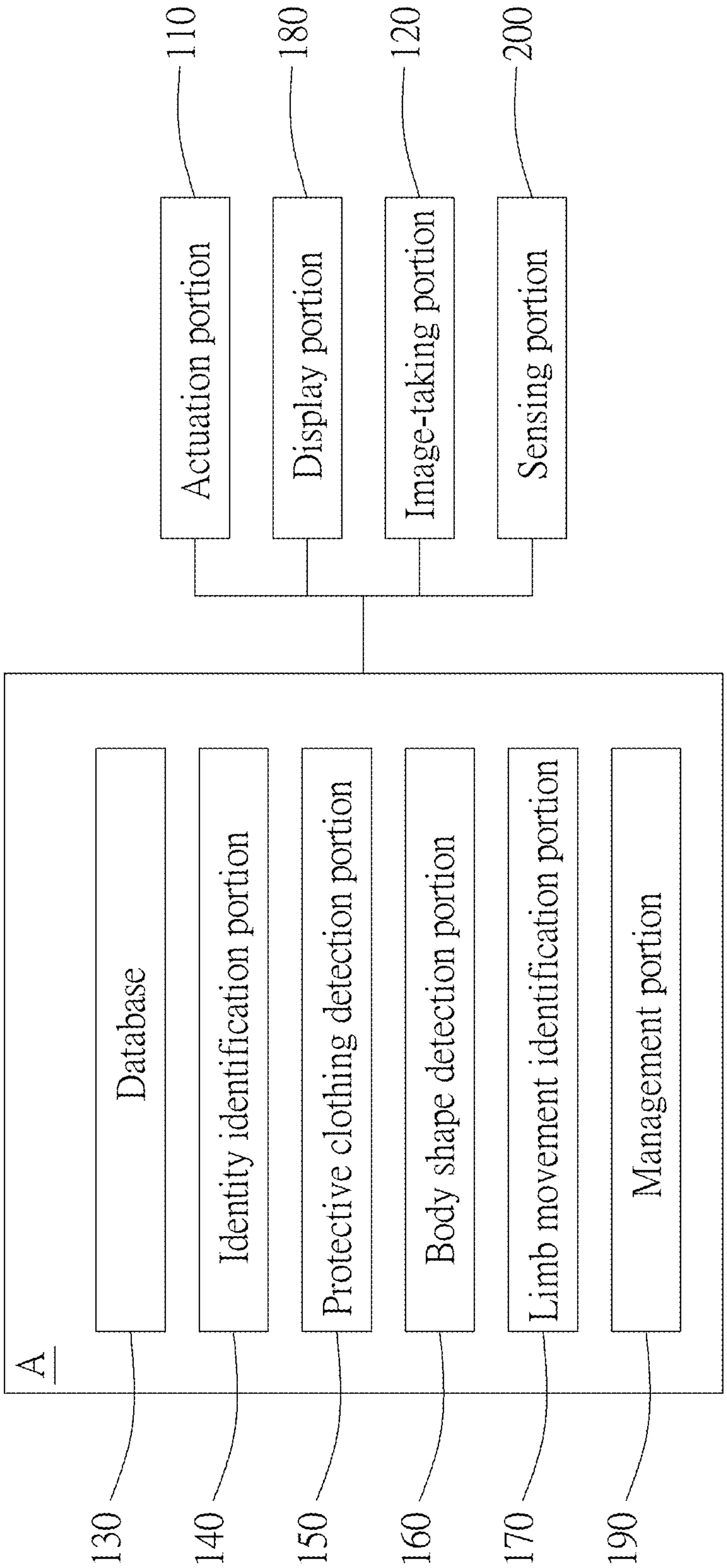
FIG. 1 is a block diagram of the system in a preferred embodiment of the present invention.
Figure 2:
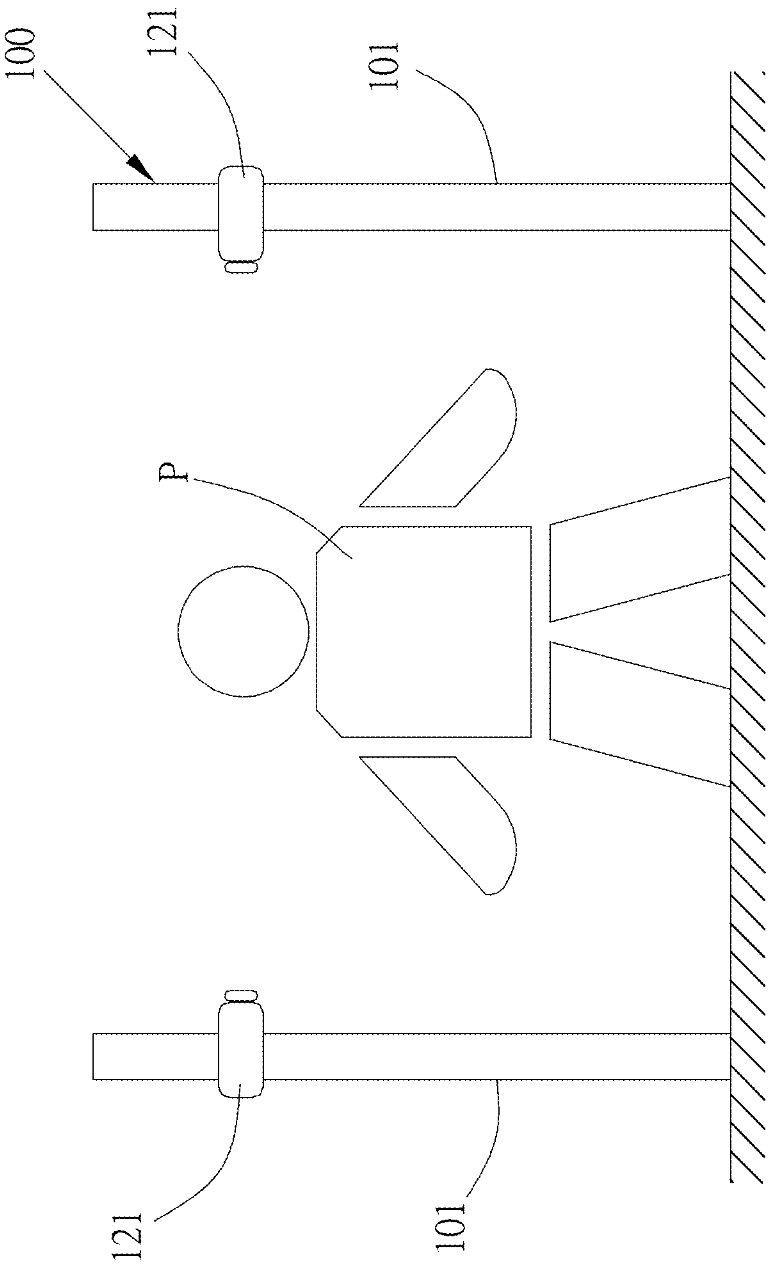
FIG. 2 schematically shows the frame and the image-taking portion in the preferred embodiment of the present invention.

Referring to FIG. 1 and FIG. 2, a preferred embodiment of the present invention provides a detection and identification system that includes a frame 100, an actuation portion 110, an image-taking portion 120, a database 130, an identity identification portion 140, a protective clothing detection portion 150, a body shape detection portion 160, a limb movement identification portion 170, a display portion 180, a management portion 190, and a sensing portion 200. Each of the database 130, the identity identification portion 140, the protective clothing detection portion 150, the body shape detection portion 160, the limb movement identification portion 170, and the management portion 190 is a piece of software, or a program, to be executed by a computation device A, and the different pieces of software or the different programs can transmit data to one another, or receive external information, and perform such handling operations as identification, detection, comparison, analysis, calculation, or computation on/with the input data or information. In this embodiment, one or a plurality of deep learning models are used to perform the handling operations, and the at least one deep learning model is properly trained and optimized to produce accurate predictions.

The computation device A may be, but is not limited to, a desktop computer, a laptop computer, a tablet computer, a mobile phone, or another device that has a screen and computing capabilities. In this embodiment, the computation device A is embedded artificial intelligence computation equipment using a Jetson nano kit. This equipment has a smaller volume than a computer and can therefore effectively reduce the volume of the system as a whole and meet factory requirements. The embedded artificial intelligence computation equipment may transmit or receive signals, either directly or indirectly, to/from the actuation portion 110, the image-taking portion 120, the display portion 180, and the sensing portion 200 through any wired or wireless medium, e.g., the fourth generation of cellular network technology (4G), the fifth generation of cellular network technology (5G), Wi-Fi, Bluetooth, near-field communication (NFC), or radio-frequency identification (RFID).

The frame 100 is the basic structure for supporting the other components. In this embodiment, the frame 100 essentially includes two parallel vertical posts 101 that extend in the direction of gravity and are provided in an air shower room. The air shower room is also provided with a storage cabinet (not shown) where plural pieces of cleaned protective clothing of differently types or sizes are placed.

Figure 4:
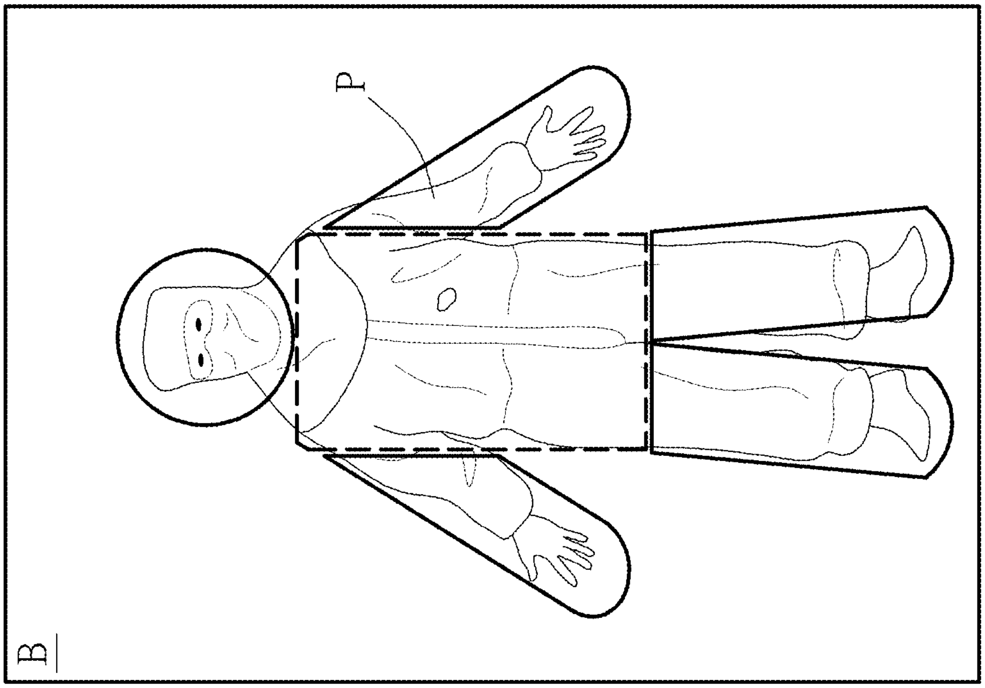
FIG. 4 schematically shows another full-body image captured by the image-taking portion in the preferred embodiment of the present invention.
Figure 3:
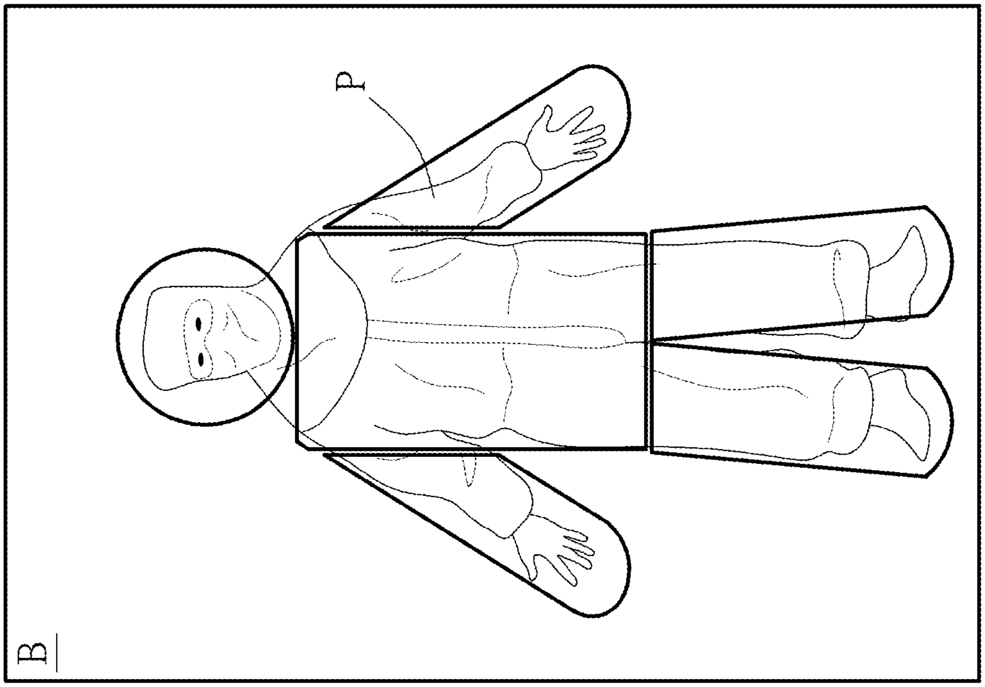
FIG. 3 schematically shows a full-body image captured by the image-taking portion in the preferred embodiment of the present invention.

The image-taking portion 120 can perform a first image-taking operation, a second image-taking operation, and a third image-taking operation. When performing the first image-taking operation, the image-taking portion 120 captures a full-body image B of a person P under detection, in order for the display portion 180 to display the full-body image B in real time, as shown in FIG. 3 or FIG. 4. When performing the second image-taking operation, the image-taking portion 120 captures a facial image of the person P under detection. When performing the third image-taking operation, the image-taking portion 120 captures a moving image of the person P under detection. The time points at which, and the number of times for which, the first image-taking operation, the second image-taking operation, and the third image-taking operation are performed are not dictated by the ordinal numbers in the names of the image-taking operations. In a feasible mode of implementation, the system can use an image stitching algorithm to stitch multiple partial images together in order to obtain the complete full-body image B and/or the moving image.

More specifically, the image-taking portion 120 includes two image-taking units 121. Each image-taking unit 121 may be, but is not limited to, a video camera, a still camera, or equipment including a charge-coupled device (CCD) or complementary metal-oxide semiconductor (CMOS). Each image-taking unit 121 is provided on one of the vertical posts 101 in a slidable manner, as shown in FIG. 2, and the two image-taking units 121 can take images of two opposite sides (e.g., the front side and the back side, or the left side and the right side) of the person P under detection at the same time.

In addition, the invention may further use image processing techniques to screen, enhance, and denoise the full-body image B, the facial image, and the moving image, thereby improving data usability and reducing noise, the objective being to ensure data quality and consistency so that the results of subsequent detection and analysis are enhanced in accuracy.

The actuation portion 110 is provided between the frame 100 and the image-taking portion 120 and is configured to drive the image-taking portion 120 to move to a first image-taking position or a second image-taking position with respect to the frame 100. That is to say, the present invention can overcome the spatial limitations of an air shower room, ensuring that the image-taking portion 120 can successfully capture images satisfying predetermined conditions. By allowing the image-taking portion 120 to be adjusted in height or position according to the stature of the person P under detection, the person P's partial, full-body, or limb movement can be completely captured regardless of the person P's body height.

When the image-taking portion 120 is at the first image-taking position, the image-taking area of the image-taking portion 120 covers the full body of the person P under detection so that the first image-taking operation or the third image-taking operation can be performed. When the image-taking portion 120 is at the second image-taking position, the image-taking area of the image-taking portion 120 covers the face of the person P under detection so that the second image-taking operation can be performed.

The actuation portion 110 includes two slide rails, two slide bases, and two driving units. Each slide rail is provided on one of the vertical posts 101 and extends in the direction of gravity. Each slide base is provided on one of the slide rails in a movable manner. Each driving unit is connected to one of the slide bases in order to drive the one of the slide bases to move with respect to the corresponding slide rail.

The database 130 may be, but is not limited to, a phase-change random-access memory (PRAM), a static random-access memory (SRAM), a dynamic random-access memory (DRAM), a flash drive, a read-only memory (ROM), a random-access memory (RAM), a magnetic disk, or an optical disk and is used to store predetermined data. In this embodiment, the database 130 stores plural pieces of worker data, wherein each piece of worker data includes historical identity information, historical facial information, historical body shape information, and historical protective clothing information, with the historical protective clothing information including a historical wearing size, a historical protective clothing type, and a historical state of use.

The identity identification portion 140 performs an identification process on the facial image, finds the historical facial information in the database 130 that matches the facial image, and thereby obtains the piece of worker data that matches the person P under detection. In other words, the image-taking units 121 of the system capture facial images of the person P under detection so that facial recognition can be carried out to identify the person P under detection as a registered worker.

The protective clothing detection portion 150 starts its operation by dividing the full-body image B into a plurality of to-be-identified regions according to the joints of the human body. For example, the to-be-identified regions are a head region, a torso region, a left arm region, a right arm region, a left leg region, and a right leg region. Then, the protective clothing detection portion 150 compares the to-be-identified regions against the historical protective clothing information and marks the to-be-identified regions according to their similarity to the historical protective clothing information in order to establish a comprehensive test dataset. Thus, in contrast to the conventional object detection models, which entail such operations as locating and classifying the equipment under detection, the protective clothing detection portion 150 of the present invention uses body part detection to form a skeleton such that only the task of classification needs to be done, and this reduces the cost and difficulty of computing with the corresponding deep learning model(s).

Next, the protective clothing detection portion 150 uses an anomaly detection method or a semantic segmentation algorithm to determine whether or not each to-be-identified region meets detection criteria. The detection criteria are based on protective clothing wearing guidelines or the surface conditions of protective clothing. The detection criteria can be changed according to practical needs.

After that, the protective clothing detection portion 150 produces the determination results as follows. Each to-be-identified region that meets the detection criteria will be displayed by the display portion 180 as marked with a first mark by the protective clothing detection portion 150, and each to-be-identified region that does not meet the detection criteria will be displayed by the display portion 180 as marked with a second mark by the protective clothing detection portion 150. The first mark and the second mark are color blocks or color frames that are different in color.

Some specific examples of the detection criteria are given below.

Example 1: The detection criteria are based on protective clothing wearing guidelines. For instance, it is required to wear a cleanroom mask and a cleanroom hood and keep the wearer's hair and nose from exposure; to wear a cleanroom suit and keep the wearer's personal upper and lower garments from exposure, with the zipper done up and the collar buttoned up; to wear antistatic shoe covers, with the string fasteners tied up, or to wear cleanroom shoes directly; and to wear antistatic gloves and antistatic cleanroom suit oversleeves, with the oversleeves tightly fastened to ensure that the sleeves of the wearer's personal clothes are not exposed.

Example 2: The detection criteria are whether the surface of the protective clothing under detection is damaged, broken, or defective. A to-be-identified region meeting the detection criteria will be viewed as passing the test, as indicated by the solid-line frames in FIG. 3 and FIG. 4. A to-be-identified region that does not meet the detection criteria will be viewed as failing the test, as indicated by the dashed-line frame in FIG. 4. Thus, it can be determined whether or not a worker wears a cleanroom suit properly, the objective being to reduce the risks associated with static electricity and particles.

Furthermore, the protective clothing detection portion 150 can perform classification, annotation, analysis, and monitoring operations according to the degree of damage or contamination of the protective clothing under detection, making it easy to identify and evaluate the damage or an improper wearing condition.

The body shape detection portion 160 uses a semantic segmentation algorithm (e.g., YOLOv8) to detect the body shape of the person P under detection in the full-body image B so that, after computing, real-time body shape information can be obtained along with real-time protective clothing information derived from the real-time body shape information. It is worth mentioning that the body shape detection portion 160 can carry out body shape identification regardless of whether or not the person P under detection in the full-body image B wears protective clothing.

Based on the real-time body shape information and the real-time protective clothing information, the system can further provide the person P under detection with proper protective clothing from the storage cabinet. This personalized operation increases the wearing comfort and safety of protective clothing.

In addition, the body shape detection portion 160 compares the real-time body shape information and the real-time protective clothing information against the historical body shape information and the historical protective clothing information in the piece of worker data that corresponds to the person P under detection, in order to determine whether or not the body shape of the person P under detection has changed, and to update the related records.

Figure 5:
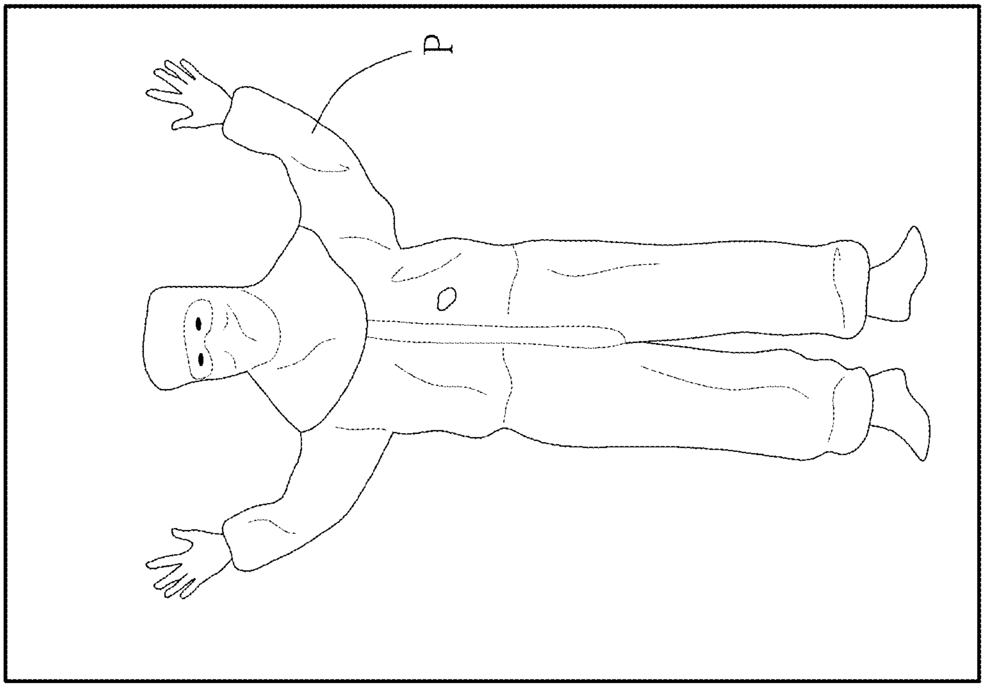
FIG. 5 schematically shows a moving image captured by the image-taking portion in the preferred embodiment of the present invention.

The limb movement identification portion 170 uses a semantic segmentation algorithm to identify whether or not the limb movement of the person P under detection in the moving image meets a cleaning standard, thereby ensuring that the person P under detection completes a particular action before entering a cleanroom. The cleaning standard may specify that the person P under detection should raise their hands above their head (as shown in FIG. 5) and turn their body through 180 degrees in the air shower room to ensure a better cleaning effect.

The management portion 190 shows a simple graphical user interface (GUI) through the display portion 180 to allow management personnel to carry out monitoring or operations. The management portion 190 may also show real-time images, detection results, and/or analysis results through the display portion 180 to help the management personnel better know the demand for protective equipment maintenance, thereby enhancing management efficiency and workplace safety.

More specifically, the management portion 190 can be implemented in the following modes by way of example.

Example 3: The management portion 190 is configured to issue warning information based on either the second mark or the real-time protective clothing information. More specifically, if the system detects any abnormal condition, such as when the protective clothing detection portion 150 determines that the protective clothing under detection is broken, damaged, or defective (i.e., when the protective clothing is marked with the second mark), the warning information will be automatically triggered in order to notify the management personnel to take necessary measures (e.g., maintenance or replacement), ensuring that no worker will work while wearing unsafe equipment.

Example 4: The images taken by the image-taking portion 120 and the data of the detection result of each of the identity identification portion 140, the protective clothing detection portion 150, the body shape detection portion 160, and the limb movement identification portion 170 are stored into the database 130, and the management portion 190 can read the data stored in the database 130 in order to perform analysis operations in relation to financial statistics, the damage record, and so on. For example, the management portion 190 keeps a detailed record of each worker's daily use of protecting clothing (in particular such abnormal conditions as violation of applicable regulations and damage of clothing) and analyzes the recorded data to create an event record that keeps track of each worker's use of protective clothing so as to facilitate subsequent management, e.g., identifying the trend of regulation violating behaviors or of the damage of protective clothing so that improvement measures can be formulated accordingly. For example, the system uses a self-adaptive algorithm to identify and handle workers' failure to comply with protective equipment-related regulations, and then the system learns from the workers' regulation violation histories by analyzing the workers' instances and frequencies of regulation violation and determining which workers have a higher tendency to violate regulations than the others. Thus, the system can adjust its identification algorithm based on the aforesaid information in order to increase the sensitivity of the algorithm, allowing more effective detection of nonconformity, the objective being to encourage the workers to comply with protective clothing regulations. For example, if a certain worker often fails to wear a safety helmet or gloves, the system can use the self-adaptive algorithm to step up identification of that worker, ensuring that the worker wears the required protective equipment properly. The system can further analyze the worker's instances and frequency of regulation violation in order for the manager to draw up a solution to handling the issue.

Example 5: The management portion 190 has a speech recognition technique and an intelligent assistant in order to provide voice-based navigation, operational guidance, and an alert regarding nonconformity in the wearing of protective clothing.

The sensing portion 200 has a plurality of sensors distributed in the air shower room where the system is installed. Each sensor is configured to detect and sense an external signal or physical feature and transmit the detected information to another device. In this embodiment, the sensors may be, but are not limited to, barcode scanners, RFID readers, or other similar devices and are used to identify a predetermined mark on the protective clothing under detection, wherein the predetermined mark may be a barcode, a quick response code (QR code), or an RFID tag to enable verification of individual workers and protective clothing. For example, workers working in or walking through a cleanroom are individually tracked, and have the related states or information recorded, as they pass the sensors.

Made up of the components described above, the detection and identification system of the present invention works in the following steps:

Step i: A person P under detection enters the air shower room where the system is installed, and the person P under detection has yet to put on protective clothing. The image-taking portion 120 captures a facial image and a full-body image (not shown) of the person P under detection.

Step ii: The identity identification portion 140 reads the facial image, performs facial recognition, and identifies the person P under detection as a registered worker.

Step iii: The body shape detection portion 160 reads the full-body image, detects in real time the body shape of the person P under detection, and updates the historical body shape information and the historical protective clothing information of the person P under detection with real-time body shape information and real-time protective clothing information respectively.

Step iv: Based on the real-time body shape information and the real-time protective clothing information, the system provides appropriate protective clothing from the storage cabinet to the person P under detection and pairs the predetermined mark on the protective clothing with the worker data of the person P under detection to make subsequent tracking more efficient.

Step v: The person P under detection puts on the protective clothing, and the systems detects whether or not the process of putting on the protective clothing is completed.

Step vi: Once the person P under detection has put on the protective clothing, the system starts the image-taking portion 120 to take another full-body image, referred to herein as the full-body image B, of the person P under detection.

Step vii: The protective clothing detection portion 150 performs an object detection process on the surface of the protective clothing in the full-body image B and uses the corresponding deep learning model to analyze the detection result, thereby determining whether or not there is damage or grime. The deep learning model can identify different types of damage such as breakage, cracks, and grime. As soon as it is verified that the protective clothing is damaged or contaminated, the management portion 190 issues the warning information to the management personnel, demanding replacement or cleaning of the protective clothing.

Step viii: The management portion 190 records each detection result (including the detection date, the detection time, and the detection result in detail) into the database 130 to establish a complete maintenance record.

Step ix: When the worker returns the protective clothing, the system performs facial recognition again to make sure that the equipment returned has the correct number. In the meantime, a sensor or camera in the storage cabinet monitors whether or not the returned protective clothing is put back in place, lest the clothing get lost or be mixed up with other pieces of protective clothing.

The embodiment described above serves only to expound the present invention. Any simple modification or change made to the disclosed embodiment by a person skilled in the art without departing from the spirit of the invention shall fall within the scope of the appended claims.

What is claimed is:

1. A detection and identification system, comprising:

a display portion:

an image-taking portion for performing a first image-taking operation, wherein when performing the first image-taking operation, the image-taking portion captures a full-body image of a person under detection, in order for the display portion to display the full-body image in real time; and a protective clothing detection portion for dividing the full-body image into a plurality of to-be-identified regions according to joints of a human body; for determining, by an anomaly detection method or a semantic segmentation algorithm, whether or not each said to-be-identified region meets detection criteria; and for marking each said to-be-identified region in such a way that each said to-be-identified region meeting the detection criteria is displayed by the display portion as marked with a first mark while each said to-be-identified region failing to meet the detection criteria is displayed by the display portion as marked with a second mark, wherein the first mark and the second mark are color blocks or color frames different in color;

wherein the image-taking portion further performs a second image-taking operation, and when performing the second image-taking operation, the image-taking portion captures a facial image of the person under detection; and wherein the detection and identification system further comprises:

a database for storing a plurality of pieces of worker data, wherein each piece of said worker data includes historical identity information and historical facial information; and an identity identification portion for performing an identification process on the facial image, finding said historical facial information in the database that matches the facial image, and thereby obtaining a piece of said worker data that matches the person under detection.

2. The detection and identification system of claim 1, wherein the detection criteria are based on protective clothing wearing guidelines or surface conditions of protective clothing.

3. The detection and identification system of claim 1, wherein the to-be-identified regions are a head region, a torso region, a left arm region, a right arm region, a left leg region, and a right leg region.

4. The detection and identification system of claim 1, wherein each piece of said worker data further includes historical body shape information and historical protective clothing information, with said historical protective clothing information including a historical wearing size; and wherein the detection and identification system further comprises a body shape detection portion for detecting, by a semantic segmentation algorithm, a body shape of the person under detection in the full-body image; for computing to obtain real-time body shape information and real-time protective clothing information derived from the real-time body shape information; and for transmitting the real-time body shape information and the real-time protective clothing information to the database to update the historical body shape information and the historical protective clothing information in the piece of worker data corresponding to the person under detection.

5. The detection and identification system of claim 4, further comprising:

a frame, with the image-taking portion movably provided on the frame; and an actuation portion provided between the frame and the image-taking portion and configured to drive the image-taking portion to move to a first image-taking position or a second image-taking position with respect to the frame, wherein when at the first image-taking position, the image-taking portion has an image-taking area covering a full body of the person under detection so as to enable the first image-taking operation, and when at the second image-taking position, the image-taking portion has an image-taking area covering a face of the person under detection so as to enable the second image-taking operation.

6. The detection and identification system of claim 5, wherein the frame comprises two parallel vertical posts extending in a direction of gravity; the actuation portion comprises: two slide rails each provided on one of the vertical posts and extending in the direction of gravity, two slide bases each movably provided on one of the slide rails, and two driving units each connected to one of the slide bases in order to drive the one of the slide bases to move with respect to a corresponding said slide rail; and the image-taking portion comprises two image-taking units each provided on one of the slide bases.

7. The detection and identification system of claim 4, further comprising a management portion for issuing warning information according to the second mark or the real-time protective clothing information.

8. The detection and identification system of claim 4, wherein the image-taking portion further performs a third image-taking operation, and when performing the third image-taking operation, the image-taking portion captures a moving image of the person under detection; and wherein the detection and identification system further comprises a limb movement identification portion for identifying, by a semantic segmentation algorithm, whether or not a limb movement of the person under detection in the moving image meets a cleaning standard.

9. The detection and identification system of claim 1, further comprising:

a frame, with the image-taking portion movably provided on the frame; and an actuation portion provided between the frame and the image-taking portion and configured to drive the image-taking portion to move to a first image-taking position or a second image-taking position with respect to the frame, wherein when at the first image-taking position, the image-taking portion has an image-taking area covering a full body of the person under detection so as to enable the first image-taking operation, and when at the second image-taking position, the image-taking portion has an image-taking area covering a face of the person under detection so as to enable the second image-taking operation.

10. The detection and identification system of claim 9, wherein the frame comprises two parallel vertical posts extending in a direction of gravity; the actuation portion comprises: two slide rails each provided on one of the vertical posts and extending in the direction of gravity, two slide bases each movably provided on one of the slide rails, and two driving units each connected to one of the slide bases in order to drive the one of the slide bases to move with respect to a corresponding said slide rail; and the image-taking portion comprises two image-taking units each provided on one of the slide bases.

* * * * *